(12) United States Patent
Takizawa et al.

(10) Patent No.: US 7,177,960 B2
(45) Date of Patent: Feb. 13, 2007

(54) MOBILE TERMINAL

(75) Inventors: Kazuyuki Takizawa, Tokyo (JP);
Tomohiro Esaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/500,553

(22) Filed: Aug. 7, 2006

(65) Prior Publication Data

US 2006/0268016 A1    Nov. 30, 2006

Related U.S. Application Data

(63) Continuation of application No. 10/816,164, filed on Mar. 31, 2004.

(30) Foreign Application Priority Data

May 9, 2003   (JP)   ............................. 2003-130985

(51) Int. Cl.
*G06F 13/28*   (2006.01)
(52) U.S. Cl. ........................................ 710/27; 370/364
(58) Field of Classification Search ..................... None
See application file for complete search history.

(56) References Cited

U.S. PATENT DOCUMENTS

| | | | | |
|---|---|---|---|---|
| 5,010,515 A | * | 4/1991 | Torborg, Jr. ................ | 345/505 |
| 5,761,516 A | * | 6/1998 | Rostoker et al. ............ | 710/260 |
| 5,838,383 A | * | 11/1998 | Chimoto et al. ............ | 348/553 |
| 7,103,357 B2 | * | 9/2006 | Kirani et al. ............ | 455/426.1 |
| 2001/0036231 A1 | * | 11/2001 | Easwar et al. ......... | 375/240.19 |
| 2002/0032027 A1 | * | 3/2002 | Kirani et al. ................ | 455/426 |
| 2004/0049789 A1 | * | 3/2004 | Bower et al. .................. | 725/75 |
| 2005/0231611 A1 | * | 10/2005 | Anderson et al. ........ | 348/231.2 |

* cited by examiner

*Primary Examiner*—Mark Zimmerman
*Assistant Examiner*—David Chu
(74) *Attorney, Agent, or Firm*—Townsend and Townsend and Crew LLP

(57) ABSTRACT

To display a horizontally oblong movie on a vertically oblong display portion, the movie may be displayed with being rotated 90 degrees by a CPU while the display portion is held in an orientation where the display portion is wider than tall. Since this arrangement puts a heavy load on the CPU, the mobile terminal according to the invention is adapted to implement the movie rotation by processings in the display portion. More specifically, an image memory in the display portion has a foursquare figure each side of which has a length the same as a longer side of a display panel of the display portion. A picture data is written on the memory in the same direction as a direction in which the picture data is read out to be transferred to the panel by the driver portion, and the driver portion rotates the picture data when transferring it.

3 Claims, 9 Drawing Sheets

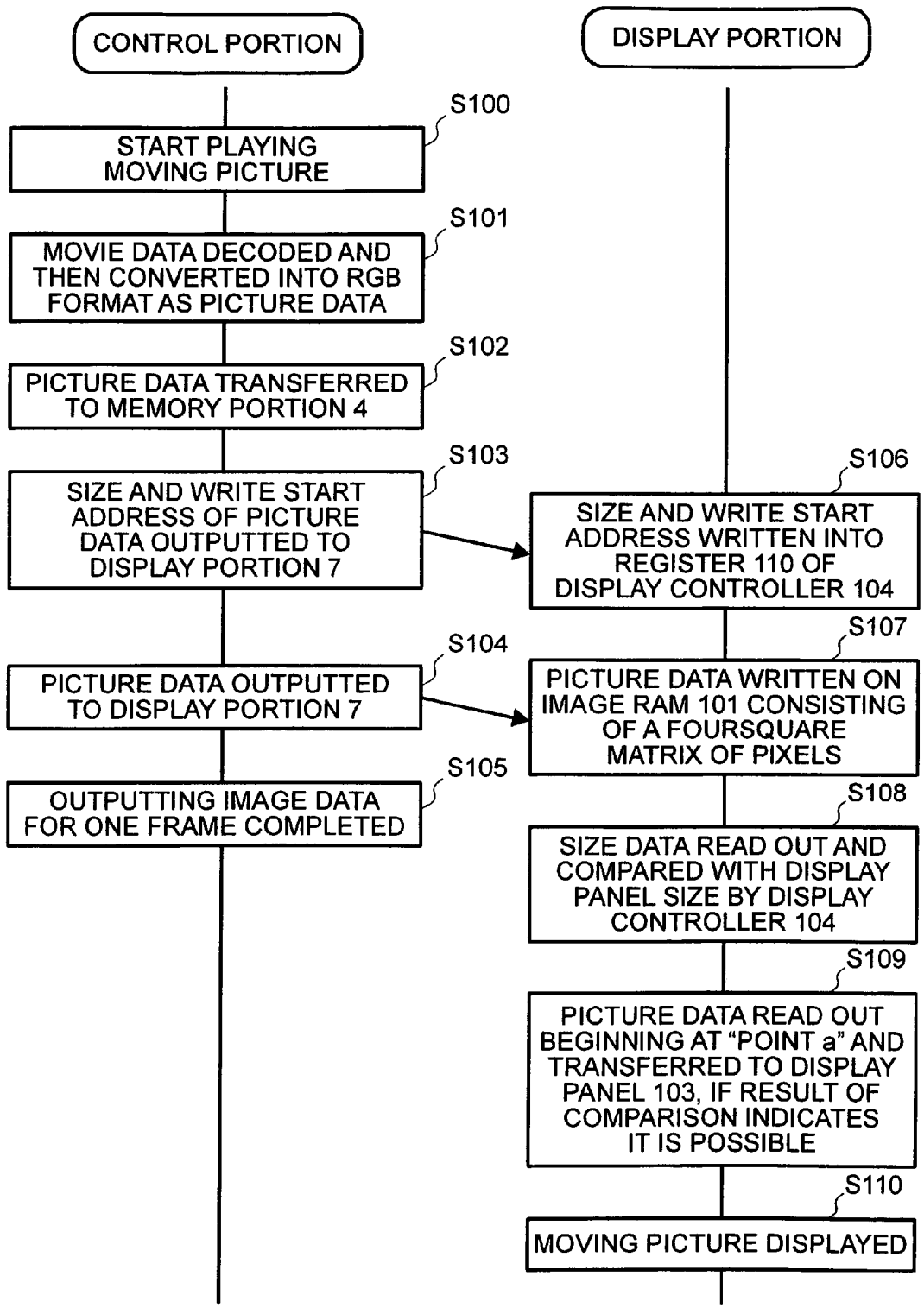

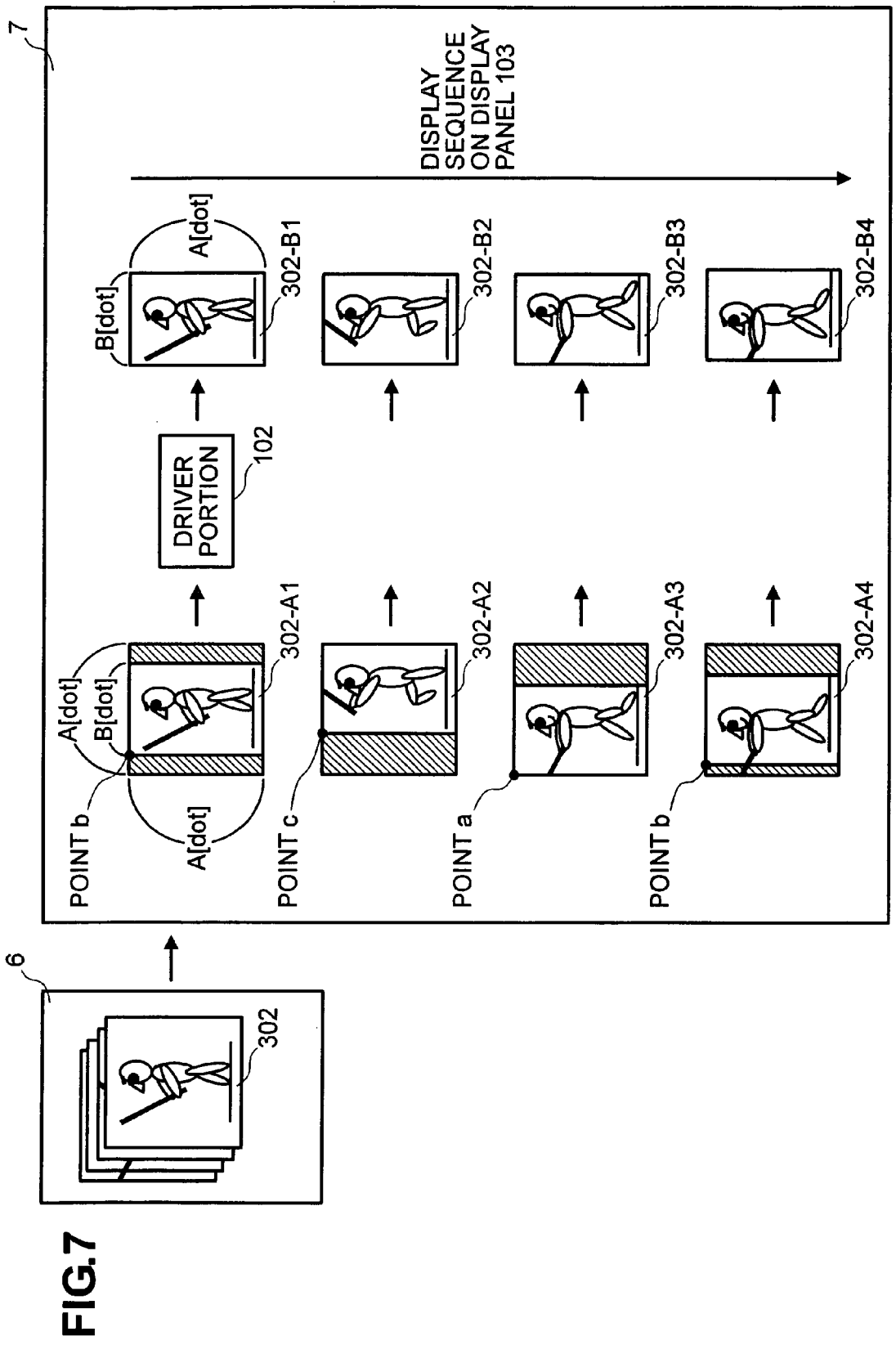

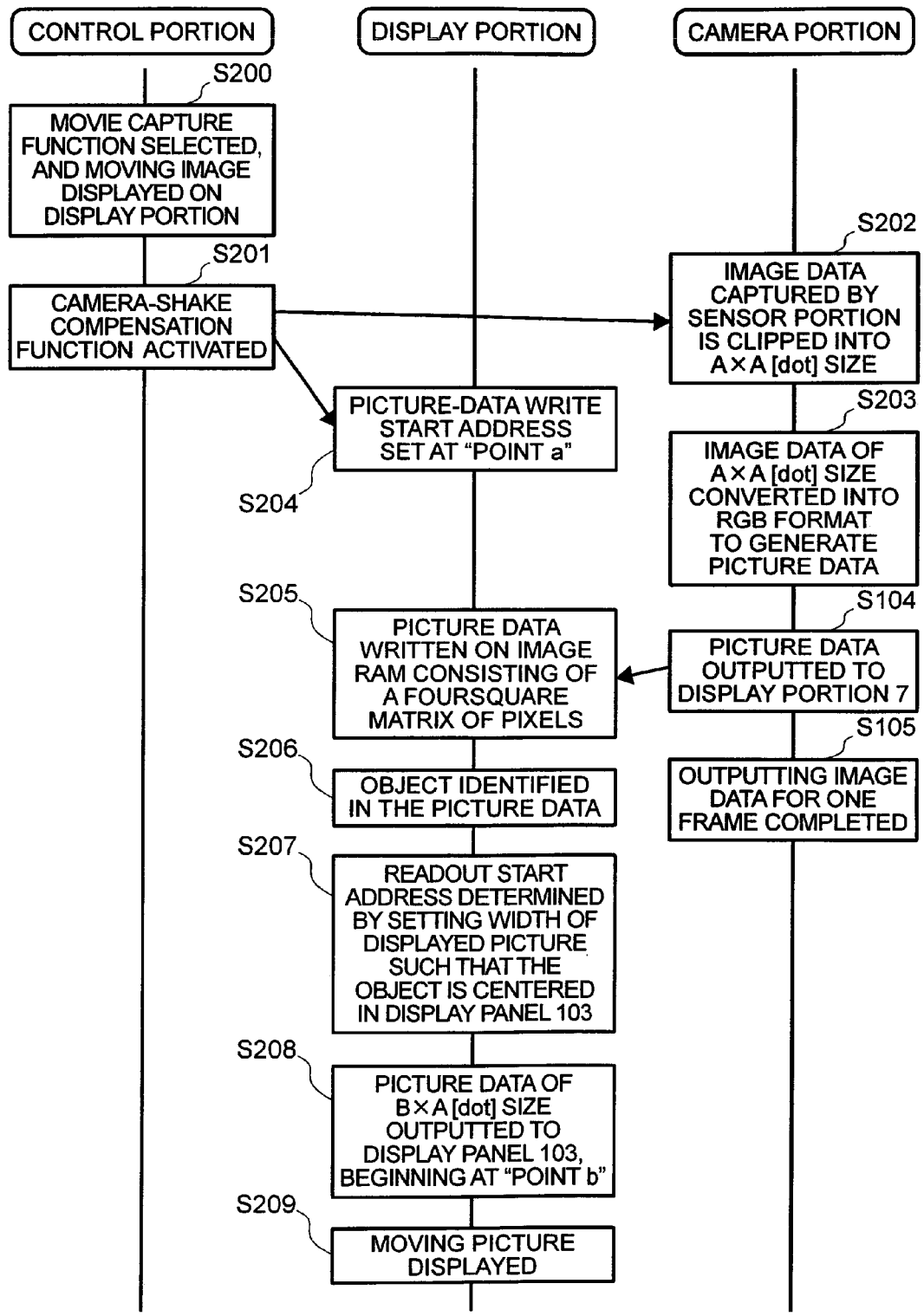

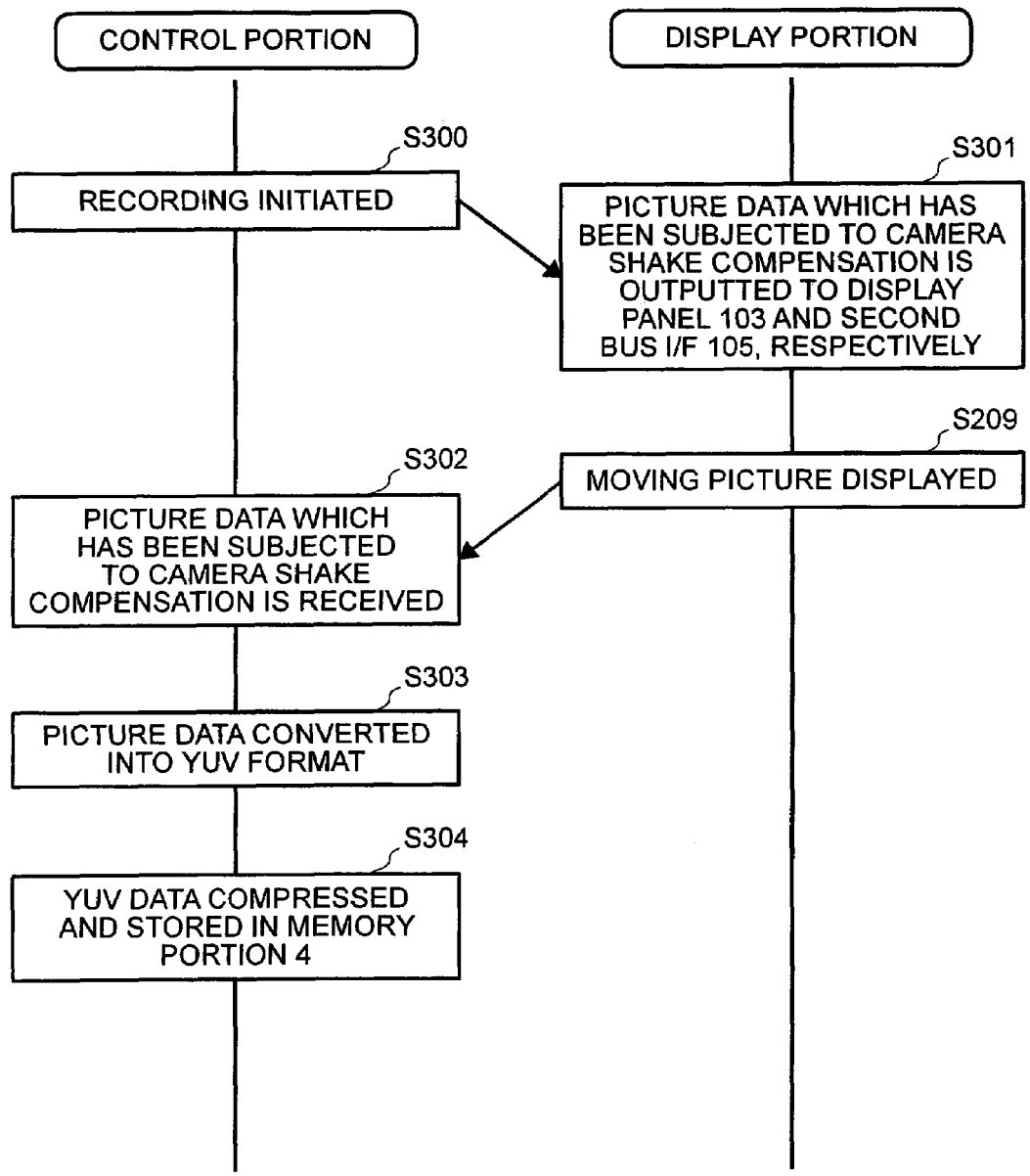

MOBILE TERMINAL

BACKGROUND OF THE INVENTION

1. Field of the Invention

The present invention relates to a mobile terminal capable of recording and displaying information, in particular, capable of taking an image of an object or scenery and displaying the taken image.

2. Description of the Related Art

Laid-Open Japanese Patent Application No. 11-143604 discloses a mobile terminal in which an orientation of a display shown on a display screen is switched, in response to the operation of a switching button by the user, or upon detection of an inappropriate direction in which the mobile terminal is currently held by the user. See "PROBLEM TO BE SOLVED" in "ABSTRACT" in the top page of the publication.

SUMMARY OF THE INVENTION

Although this conventional mobile terminal is capable of displaying an image on the display screen in an appropriate orientation depending upon the direction of the mobile terminal as held by the user, the mobile terminal is not adapted to suitably display an image depending upon a figure of the image.

Further, according to the conventional mobile terminal, the orientation of the image is switched such that the image is always displayed in its nominal or appropriate orientation, irrespective of the direction in which the mobile terminal is held, i.e., irrespective of whether the top and bottom edges of the display screen having an oblong figure is the longer edges or the shorter edges of the display screen. However, the publication does not disclose how this switching of the image orientation is carried out.

An object of this invention is, therefore, to provide a mobile terminal exhibiting an enhanced user-friendliness, by solving the above-described problems.

This object is attained by the invention as defined in claims appended hereto.

According to the invention, a mobile terminal with an enhanced user-friendliness can be provided.

BRIEF DESCRIPTION OF THE DRAWINGS

FIG. 4 shows one example of a data processing sequence following which an image data of the moving picture having the vertically oblong rectangular figure is processed to display the moving picture on the display panel of the mobile terminal.

FIG. 7 is a schematic view illustrating a process of camera shake compensation in a mobile phone according to a second embodiment of the invention.

FIG. 8 shows one example of a data processing sequence according to which the process of camera shake compensation is executed in the mobile phone.

FIG. 9 shows one example of an operation sequence following which a picture data of a moving picture which has been subjected to the camera shake compensation is stored in a memory portion, in a mobile terminal according to a third embodiment of the invention.

DESCRIPTION OF THE PREFERRED EMBODIMENTS

There will be described several embodiments of the invention by reference to the accompanying drawings. As one example of a mobile terminal according to the embodiments of the invention, a mobile phone will is described below. However, the gist of the invention may be applied to any other terminals which are portable and capable of displaying images, such as a PHS (Personal Handyphone System phone) and PDA (Personal Digital Assistant).

Figure 1:
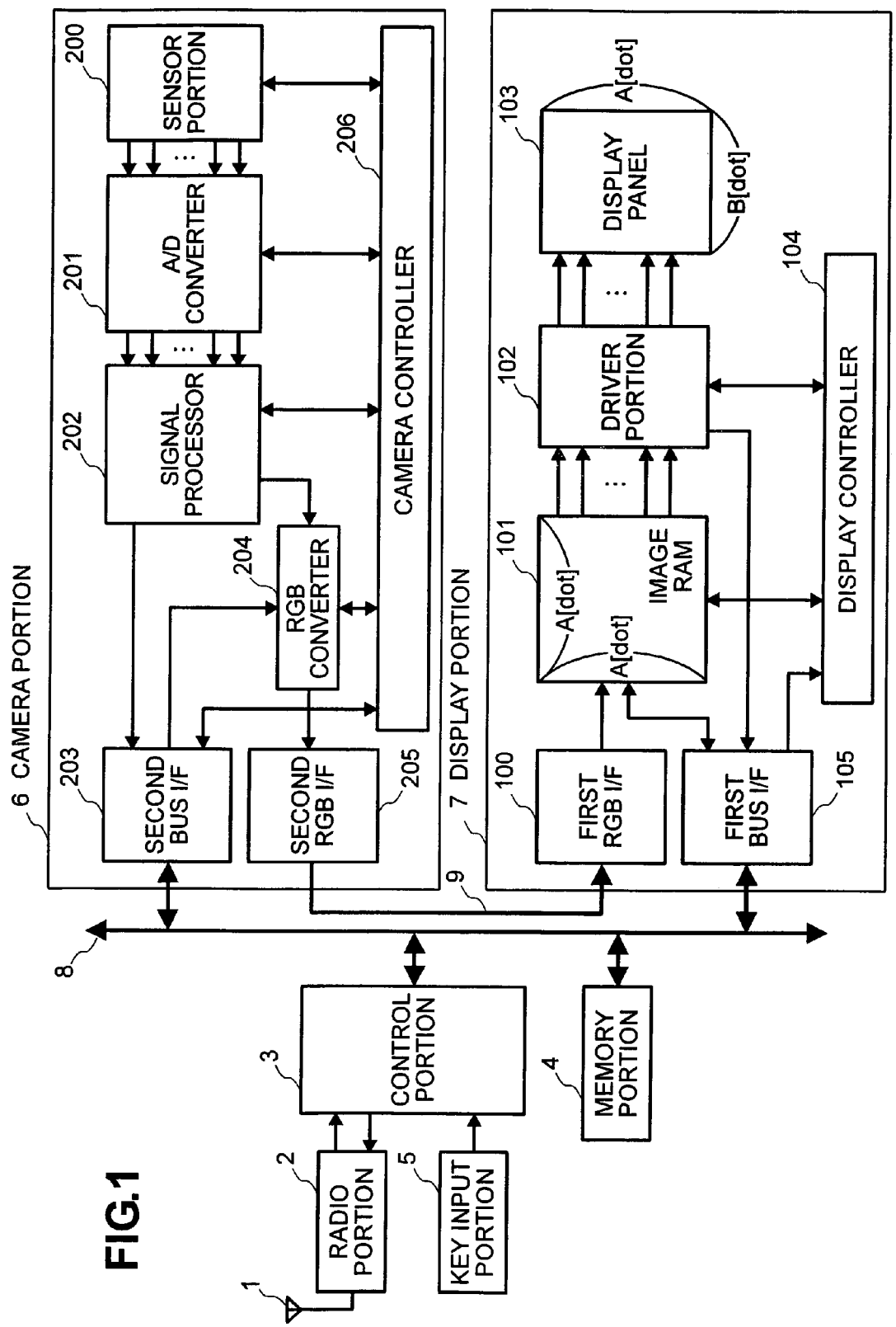
FIG. 1 is a block diagram schematically illustrating structure of a mobile terminal according to a first embodiment of the invention.

An internal structure of the mobile phone according to a first embodiment of the invention is shown in FIG. 1, in which an antenna portion 1 is connected to a radio portion 2 which receives and transmits radio signals under control of a control portion 3. The control portion 3 is connected to a key input portion 5 where manipulation of keys by a user is detected. To the control portion 3 are also connected, via a data bus 8 of the control portion 3, a memory portion 4, camera portion 6 and a display portion 7. The memory portion 4 stores data, and also functions as a work area during running of an application. The camera portion 6 operates to take an image, while the display portion 7 operates to display an image. Though it is not shown in FIG. 1, a signal processor dedicated to a speech communication feature rendered by the mobile terminal is also connected to the control portion 3. A microphone and a telephone receiver are connected to the signal processor.

There will be described interfaces connecting the control portion 3, the camera portion 6 and the display portion 7 to each other, as well as data flows among these elements. The control portion 3, the camera portion 6 and the display portion 7 are connected to each other through the data bus 8 of the control portion 3. Further, the camera portion 6 and the display portion 7 are also connected to each other through a picture bus 9 which is exclusively used for displaying images. More specifically described, the data bus 8 is connected to four LSIs respectively corresponding to the control portion 3, memory portion 4, camera portion 6 and display portion 7. The four LSIs send and receive data to and from one another. The picture bus 9 is an exclusive interface for connection between the camera portion 6 and the display portion 7, so that a data outputted from the camera portion 6 is inputted into the display portion 7.

There will next be described an inner structure of the display portion 7. The display portion 7 includes a first RGB I/F 100, an image RAM 101, a driver portion 102, a display panel 103, a display controller 104 and a first bus I/F 105. The first bus I/F 105 connects to the control portion 3 through a data bus 8. A picture data which is outputted from the camera portion 6 is inputted into the first RGB I/F 100, without being transmitted to the control portion 3, but via the picture bus 9 as an RGB interface, so that the outputted image is directly processed at the display portion 7 without being controlled by the control portion 3. The image RAM 101 is designed such that it consists of a matrix of pixels (or dots), a part of which corresponds to entire dots on the display panel 103, such that a number of pixels of one of a row and a column of the matrix of the image RAM 101 which one is shorter than the other, is larger than a number of dots of one of a row and a column of a matrix of the dots on the display panel 103 which one is larger than the other. The picture data sent from the first RGB I/F 100 or first bus I/F 105 is written into the image RAM 101. The picture data written into the image RAM 101 is then read out from the image RAM 101 and transferred to the display panel 103 by the driver portion 102, so as to be displayed on the display panel 103. This series of actions is controlled by the display controller 104.

As one example, there will be described a specific case where the image RAM 101 consisting of a foursquare matrix of pixels each side of which has a number of pixels which is equal to the number of pixels or dots of the longer one of the row and column of the matrix of the display panel 103. This relative size of the image RAM 101 to the display panel 103 is the minimum for achieving effects of the invention. In this specific case, the display panel 103 has a longer side consisting of dots the number of which is A, and a shorter side consisting of dots the number of whish is B. Accordingly, the image RAM has a foursquare figure each side of which has a length corresponding to the number A of pixels.

Further, the image RAM 101 may not be a single memory area, but may consist of a plurality of segments. In the latter case, the display controller 104 operates to manage an address space when to write the picture data on the plurality of segments of the image RAM 101. In a case where it is arranged such that each segment of the image RAM 101 is independently controllable with regard to operation modes such that the segments can be powered on/off and held in a standby mode independently from one another, it is possible to power off a segment on which the picture data is not written, or to hold that segment in the standby mode, since a size of the picture data to be written to the image RAM 101 is known in advance. According to this arrangement, the electricity consumption during the writing operation is advantageously reduced.

There will be next described an inner structure of the camera portion 6. A sensor portion 200 comprises a multiplicity of light receiving elements to capture an image data to be processed. The image data is converted into digital signals by an A/D converter 201, and then converted into YUV format by a signal processor 202. In addition to converting the image data captured by the sensor portion 6 into the YUV format, the signal processor 202 is also adapted to process the taken image so that the finally displayed image has a sepia or black-and-white tone, if commanded so by the control portion 3. Furthermore, the signal processor 202 executes various processes related to adjustments made when taking the moving picture, e.g., white balance correction.

The image data converted into the YUV format in the signal processor 202 is then outputted from a second bus I/F 203 into the control portion 3 via the data bus 8 of the control portion 3. The image data is encoded by the control portion 3 into an MPEG or JPEG format and stored in the memory portion 4. In addition to the second bus I/F 203, the image data converted into the YUV format by the signal processor 202 is also sent to an RGB converter 204, where the image data is converted into an RGB format. This RGB data is outputted from a second RGB I/F 205 into the display portion 7 through the picture bus 9. This series of actions is controlled by a camera controller 206.

The mobile phone operates under one of three operation modes to handle a movie data, namely: (a) a Monitor mode in which an image captured by the camera portion 6 is merely displayed on the display panel 103, without being stored, (b) a Record mode in which a moving image captured by the camera portion 6 is displayed on the display panel 103 while being recorded at the same time, and (c) a Play mode in which a movie file which is stored in the memory portion 4 or downloaded from the Internet is played.

Each of the operation modes will be described. First, the Monitor mode will be illustrated. Since the Monitor mode does not involve recording operation, the image data taken by the camera portion 6 need not be transferred to the control portion 3, but is converted into the RGB image data by the RGB converter 204 incorporated in the camera portion 6. The RGB data is then transferred from the second RGB I/F 205 of camera portion 6 to the first RGB I/F 100 incorporated in the display portion 7 through the picture bus 9. The picture data directly transferred from the camera portion 6 to the display portion 7, not through the control portion 3, is written into the image RAM 101 consisting of the foursquare matrix of pixels. The picture data is then read from the image RAM 101 and transferred to the display panel 103 by the driver portion 102 so that the picture is displayed on the panel 103, in accordance with overall display timings in the display portion 7.

Generally, when a user takes a moving picture with a built-in camera of a mobile phone, a time span during which the user is trying to find a good angle and waiting for the right timing to take the picture is longer than a time span during which the user actually takes the picture. Accordingly, the Monitor mode is the mode established in a major part of an entire time which is required for each taking of moving pictures. According to the present embodiment, an operation of the control portion 3 in such a Monitor mode, which is usually required, is made unnecessary, for thereby advantageously saving an electric power conventionally consumed by the control portion 3 in the Monitor mode. This contributes to elongate a continuous operational time of the mobile phone.

Next, the Record mode will be described. In the Record mode, the image data is transferred to the control portion 3 as well as to the display portion 7. The control portion 3 encodes the image data and then stores the encoded image data in the memory portion 4, while the display portion 7 operates to display the image data. More specifically described, the image data captured by the camera portion 6 is first converted into the YUV data by the signal processor 202. On one hand, the YUV data is inputted into the control portion 3 from the second bus I/F 203 via the data bus 8, then encoded by the control portion 3, and stored as a movie file in the memory portion 4. On the other hand, the YUV data is converted into the RGB format also, by the RGB converter 204, then transferred to the first RGB I/F 100 of the display portion 7 from the second RGB I/F 205 of the camera portion 6 and via the picture bus 9. The picture data directly sent to the display portion 7 is written on the image RAM 101 consisting of the foursquare matrix of pixels, and then read out and transferred to the display panel 103 by the driver portion 102 to be displayed thereon, in accordance with the overall display timings in the display portion 7.

In the Record mode, the recording operation of the control portion 3 and the display operation of the display portion 7 are concurrently performed.

The Play mode will be described. The Play mode is a mode selected: to play a movie file containing a movie data which was previously taken by using the camera portion 7 built in the mobile terminal or by using other cameras and stored in the memory portion 4; or to play a movie file downloaded from the Internet. In each case, the movie data of the movie file is sent to the control portion 3 by which the movie data is decoded, then transferred to the camera portion 6 via the data bus 8, and subsequently converted into the RGB data by the RGB converter 204. The RGB data is transferred from the RGB I/F 204 of the camera portion 6 to the RGB I/F 100 of the display portion 7 via the picture bus 9, without being transmitted to the control portion 3. The RGB data directly transferred to the display portion 7 is written into the image RAM 101 having the foursquare matrix of pixels, and then read and transferred to the display panel 103 by the driver portion 102 to be displayed on the panel 103, in accordance with the overall display timings in the display portion 7.

As described above, in the Play mode, the movie data which has been decoded by the control portion 3 is converted into the picture data by the RGB converter 204 of the camera portion 6. In other words, the camera portion 6, which basically functions to take images, also functions to cooperate to "play" the moving picture, which leads to an increase in the power consumption. To avoid this drawback, the control portion 3, instead of the RGB converter 204, may operate to convert the movie data into the RGB format. In this case, the RGB data is transferred to the first bus I/F 105 of the display portion 7 via the data bus 8, and then written on the image RAM 101. Or alternatively, the display portion 7 may operate to convert the movie data into the RGB format.

Figure 2:
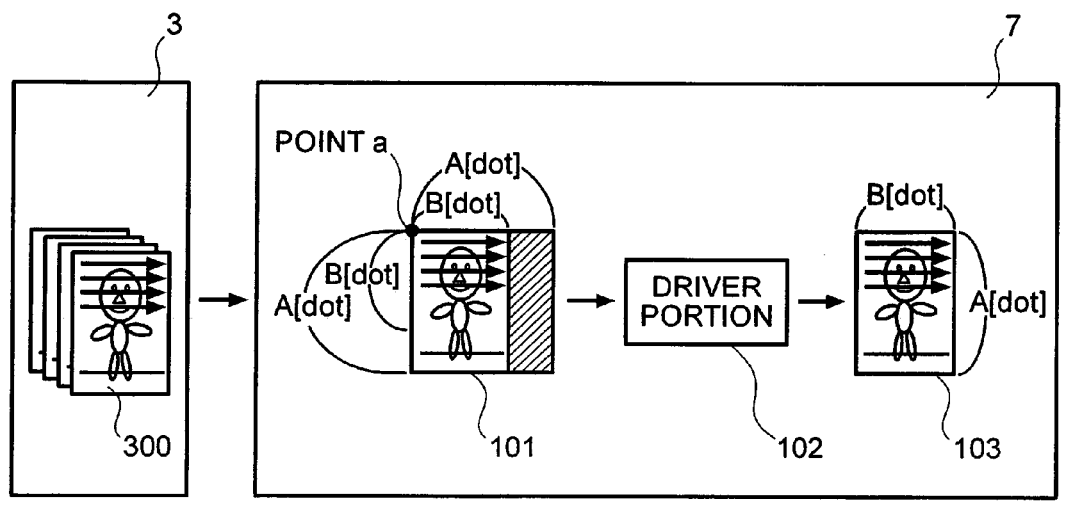
FIG. 2 is a schematic view illustrating a method of processing a picture data of a moving picture having a vertically oblong rectangular figure, to display the moving picture on a display panel of the mobile terminal according to the first embodiment.

In FIG. 2 is schematically shown how the picture data is processed to display a moving picture having a vertically oblong figure on the display panel 103 of the display portion 7. A specific case where a moving picture 300 having a vertically oblong rectangular figure whose height and width are respectively a number A of pixels (or dots) and a number B of pixels (or dots) (i.e., the number of pixels in one column of the moving picture 300 is A, the number of pixels in one row of the moving picture 300 is B, and A is larger than B) is played will be illustrated, by way of example.

Figure 3A:
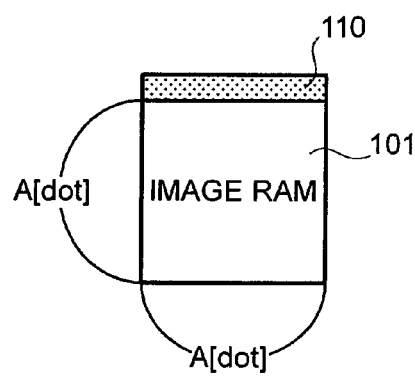
FIG. 3 is a schematic view showing a memory area in the mobile terminal, in which a data representative of a write start address of the picture data and a data representative of a size of the picture data are stored.
Figure 3B:
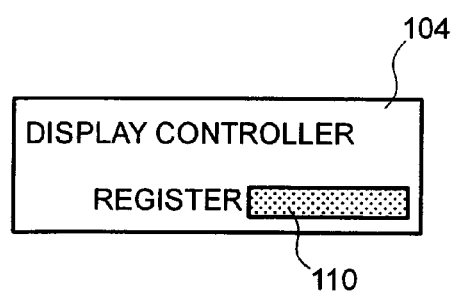

FIG. 3 is a schematic view showing a memory area 110 in which the size and the write start address of the picture data are stored. FIG. 3A shows a first arrangement where the image RAM 101 consisting of the foursquare matrix of pixels is expanded to store the size and write start address of the picture data as a part of the entire data stored in the image RAM 101. In other words, a capacity corresponding to a sum of sizes of the data representative of the size of the picture data (which will be referred to as "size data") and the data representative of the write start address of the picture data (which will be referred to as "write-start-address data") is added, as the memory area 110, to the image RAM 101, since the size of the image RAM 101 can not be reduced. FIG. 3B shows a second arrangement where a memory area 110 for storing the size data and the write-start-address data of the picture data is provided in the display controller 104. In this case, the memory area 110 takes the form of a register, and the size data and write-start-address data are written on respectively corresponding bits in the register.

FIG. 4 illustrates one example of a data processing sequence following which the image data of the moving picture having a vertically oblong figure is processed to be displayed on the display panel 103. This process is initiated with a command inputted into the mobile phone by the user to play the moving picture 300 (step S100). The image data of the moving picture 300 is decoded by the control portion 3, and then converted into the RGB format (step S101). The RGB data is buffered in the memory portion 4 (step S102). Since the image to be displayed is a moving picture, an original data consists of multiple frames. While displaying the moving picture 300, the control portion 3 controls the decoding of the moving picture 300 such that picture data corresponding to at least one frame is buffered in the memory portion 4 so that continuous refreshing of the displayed image is smoothly effected. The picture data generated in the control portion 3 and then buffered in the memory portion 4 is outputted from the control portion 3 to the data bus 8 to be inputted into the first bus I/F 105 of the display portion 7. Then, the picture data is written on the image RAM 101 consisting of the foursquare matrix (step S104).

The control portion 3 is able to obtain the size of the picture data, by reading in a header data of the picture data during decoding the image data. The picture data is written on the image RAM such that, in transferring the picture data corresponding to one row of the matrix of the image RAM 101, the control portion 3 operates to designate an address in the image RAM 101 so that a picture data corresponding to more than one row of the image RAM 101 is not continuously written on a single row of the image RAM 101. It does not matter if there is a space where no picture data is written on one of the left or right sides in the foursquare matrix of the image RAM 101. In the case shown in FIG. 2, the writing is started from the uppermost and leftmost pixel ("point a" in FIG. 2) and progresses rightward, and when the writing is completed in the uppermost row, it is then executed on the second uppermost row from the left toward the right. Thus, the writing is executed on the row-by-row basis, from the top to the bottom as seen in FIG. 2. As a result, a vertically oblong image is written left-justified or along the left edge on the foursquare matrix of pixels of the image RAM 101.

Since the volume of data displayed on the display panel 103 is smaller than the capacity of the image RAM 101 consisting of the foursquare matrix, an assignment regarding which part of the image written on the image RAM 101 is to be displayed on the display panel 103 must be provided to the driver portion 102. Hence, the control portion 3 is adapted to also output the size data and write-start-address data of the picture data to the display portion 7, when outputting the picture data (step S103). These data may be written into the exclusive register in the display controller 104 of the display portion 7 through the first bus I/F 105, prior to the outputting of the picture data. However, it is not essential to write the size data and write-start-address data into the display controller 104 prior to the outputting of the picture data, but these data may be sent concurrently with the picture data, or alternatively, after and in succession to the picture data.

The size data and write-start-address data of the picture data are also written into the display controller 104 (step S106), and an amount of the picture data corresponding to one frame of the moving picture 300 is transferred to the image RAM 101 consisting of the foursquare matrix of pixels (step S107). Then the display processing is initiated, in accordance with display timing signals generated in the display portion 7. The display controller 104 operates to read in the size data of the picture data and make a comparison between the size of the picture data and a size of data the display panel 103 displays thereon (step S108). If the display controller 104 determines that the result of the comparison indicates that the entire picture data written on the image RAM 101 consisting of the foursquare matrix can be displayed on the display panel 103, the driver portion 102 starts reading out the picture data row by row and from the "point" a in the image RAM 101, which "point" a has been designated as the write start address in the prior steps. An amount of the picture data corresponding to the size data is read out from the image RAM 101 top to down, while being sequentially transferred to the display panel 103 (step S109) so that the picture data is displayed thereon (step S110). To continuously display the moving picture, the above-described operation is reiterated.

The timings to execute operations related to display of the next frame varies depending upon a frame rate which the moving picture to be played is assigned. In a case where the moving picture 300 to be played is assigned a high frame rate, producing the picture data and transmitting the produced data to the display portion 7 need to be processed in parallel. On the other hand, if the moving picture 300 is assigned a low frame rate, the control portion 3 may suspend its operation during the picture data for one frame is being outputted to the display portion 7 for the sake of reducing power consumption, and resume the process of producing the picture data for the next frame, upon completion of the outputting the picture data for the previous one frame.

Although it is not shown in FIG. 4, the process of playing the moving picture as explained here is suspended or terminated at a desired point of time, in response to manipulation by the user, or by utilizing a timer function of the mobile terminal. The suspension or termination process is given a highest propriety in the data processing sequence shown in FIG. 4, and executed immediately upon it as requested irrespective of which step in this sequence is currently executed. Such a termination or suspension process is applicable to all data processing sequences described later.

Figure 5:
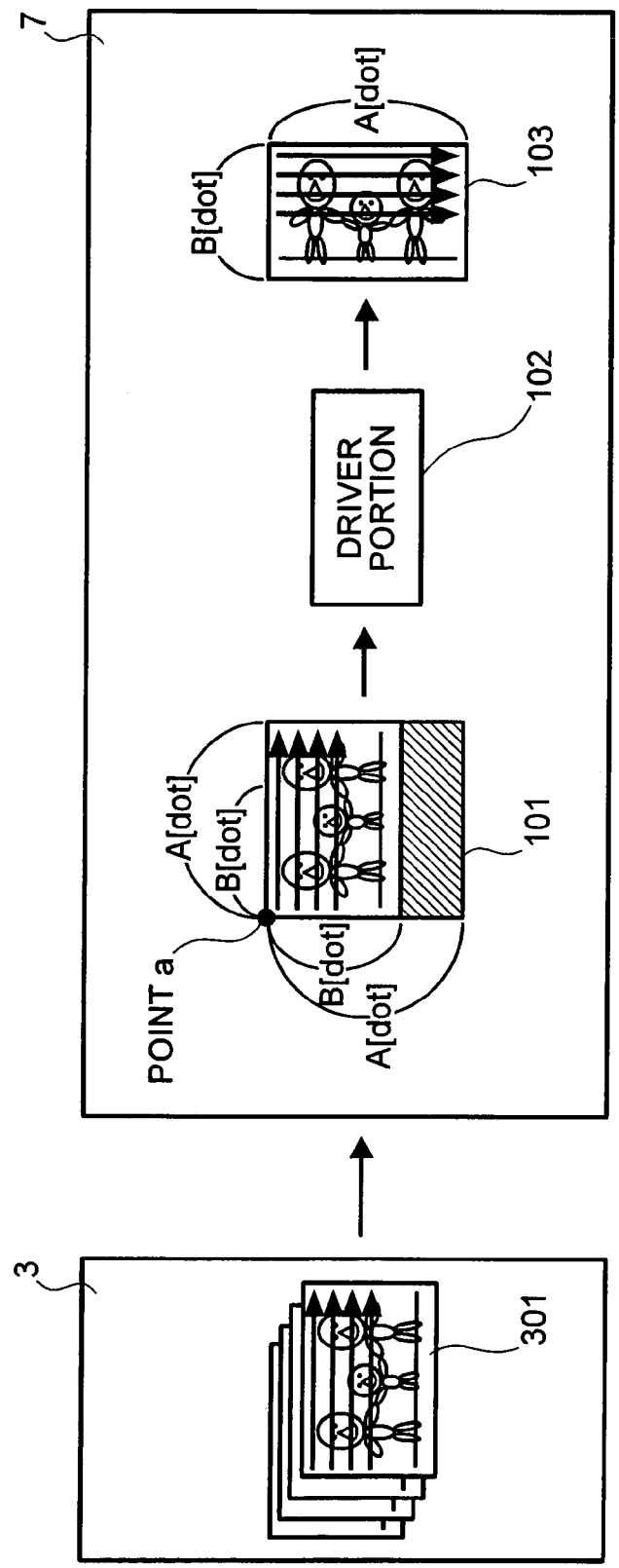
FIG. 5 is a schematic view illustrating a method of processing a picture data of a moving picture which has a horizontally oblong figure, to display the moving picture on the display panel of the mobile terminal.
Figure 6:
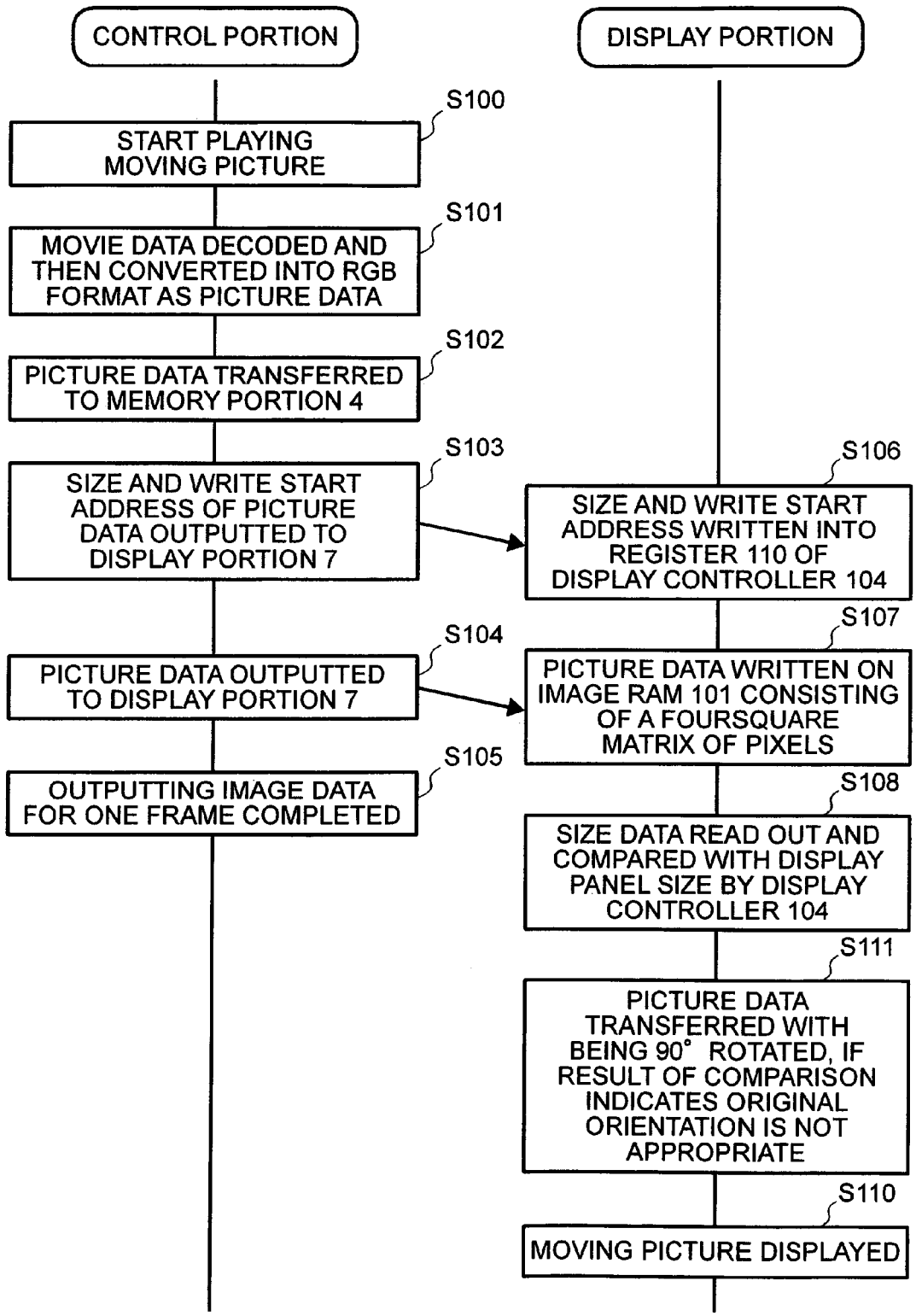
FIG. 6 shows one example of a data processing sequence following which an image data of the moving picture having the horizontally oblong figure is processed to display the moving picture on the display panel of the mobile terminal.

FIG. 5 is a schematic view illustrating how a picture data is processed when to display a moving picture having a horizontally oblong figure on the display panel 103 of the display portion 7. A specific case where a moving picture 301 having a horizontally oblong figure whose height and width respectively correspond to a number B of pixels (or dots) and a number A of pixels (or dots) (i.e., the number of pixels in one column is B, the number of pixels in one row is A, and A is larger than B) is played will be illustrated, by way of example. FIG. 6 shows one example of a data processing sequence following which the moving picture having the horizontally oblong figure as shown in FIG. 5 is displayed on the display panel 103.

The process of playing the horizontally oblong moving picture is basically similar to the process of playing the vertically oblong moving picture as described above except the difference in their figures, as long as it is concerned with the steps from S101 to S108.

In the mobile terminal, upon receiving a command to play the horizontally oblong moving picture 301 (step S100), the moving picture 301 is decoded by the control portion 3, and then converted into the RGB format (step S101). Subsequently, the RGB data is buffered in the memory portion 4 (step S102). The picture data generated in the control portion 3 and then buffered in the memory portion 4 is outputted from the control portion 3 to the data bus 8 to be inputted into the first bus I/F 105 of the display portion 7. Then, the picture data is written on the image RAM 101 consisting of the foursquare matrix (step S104).

The control portion 3 obtains the write start address of the picture data on the basis of the size data read in when decoding the picture data. In the present example, the width of the picture data corresponding to the number A of pixels (or dots) coincides with the width of the image RAM 101 consisting of the foursquare matrix of pixels. Therefore, the picture data is written on the image RAM 101 in a full row or line, starting from the leftmost and topmost pixel (i.e., "point a" in FIG. 5). Like the case where the vertically oblong moving picture 300 is played, the size data and the write-start-address data of the horizontally oblong moving picture 301 are outputted to the display portion 7 (step S103). These size and write-start-address data are written into the display controller 104 (step S106), and an amount of the picture data corresponding to one frame of the moving picture 301 is transferred to the image RAM 101 consisting of the foursquare matrix of pixels (step S107). Upon completion of the data transfer, displaying process is initiated in accordance with the display timing signals generated in the display portion 7. The display controller 104 reads in the size of the picture data, and compares it with the size of the display panel 103 (step S108). In a case where the result of the comparison indicates that a part of the picture data could not be displayed, if the picture data written on the image RAM 101 consisting of the foursquare matrix is directly displayed on the display panel 103, the picture is displayed in a 90-degrees rotated orientation. In this case, the driver portion 102 reads out the picture data row by row from the image RAM 101 consisting of the foursquare matrix of pixels, starting from the "point a" which has been designated as the write start address; and the read data is transferred to and written on the display panel 103, with the height and width directions being interchanged (step S111), to display the picture data (step S110). To continue to display the moving picture, the above-described operation is reiterated. In this arrangement where the picture data is written on the image RAM 101 in the lateral direction and the picture data is then written on the display panel 103 in the vertical direction from top down, as shown in FIG. 5, it may be adapted such that, before all of the picture data corresponding to one frame of the moving picture 301 has been written on the image RAM 101, namely, when only an amount of the picture data corresponding to one row of the image RAM 101 is read out by the driver portion 102, the corresponding portion or line in the picture is played on the display panel 103 in the 90-degrees rotated orientation. According to this arrangement, the driver portion 102 need not suspend its readout operation until the entire picture data for the one frame has been written into the image RAM 101, thereby effectively reducing a time required for the image displaying process.

In an arrangement where the rotation of the picture is executed by the control portion 3, two memory areas are required, namely, one for placing the picture before rotation and the other for placing the picture after rotation, and thus a capacity double of the size of the display panel 103 must be afforded in the memory portion 4 connected to the data bus 8 of the control portion 3. On the other hand, according to the present embodiment where the driver portion 102 operates to rotate the picture, a required capacity of the memory portion 4 is advantageously reduced.

Further, in the arrangement where the rotation of the picture is executed by the control portion 3, a part of the memory portion 4 connected to the data bus 8 of the control portion 3 is utilized for the rotating process, and thus the picture data is transferred from the memory portion 4 to the control portion 3 and then back to the memory portion 4. According to the arrangement, the control portion 3 must frequently manage data transfer using the data bus 8. This hinders execution of main tasks of the control portion, namely, decoding process and the displaying process to play the picture on the display panel. Thus, the performance of the control portion 3 during a relevant application is running is deteriorated. On the other hand, the arrangement according to the present embodiment, where the driver portion 102 which is incorporated in the display portion 7 executes the picture rotating process, advantageously prevents an excessive traffic in the data bus 8, as well as the deterioration in the performance of the control portion 3 during the relevant application is running.

With regard to the process of displaying the picture data on the display panel 103 as shown in FIGS. 2 and 5, it is noted that the memory area in the image RAM 101 corresponding to the shaded portion in FIGS. 2 and 5 is left unused, thereby wasting electric power considerably. Hence, on the basis of the size of the picture data sent from the control portion 3, the image RAM 101 having the foursquare matrix is previously divided into two parts, one of which is to be left unused while the other of which is to be used, and the one part to be left unused is switched to a low power-consumption mode. This arrangement contributes to reduce a total electric power consumption in the mobile terminal, effectively elongating the continuous operational time of the terminal as a consequence.

FIG. 7 is a schematic view illustrating a method of processing an image data in a case where a movie data having a foursquare figure and captured by the camera portion 6 is subjected to a camera shake compensation and is displayed on the display portion 7. FIG. 8 shows one example of a data processing sequence following which the camera shake compensation is executed, without operation of the control portion 3.

There will be described how the movie data is processed in the camera sake compensation, by illustrating a specific case where a moving picture 302 having a foursquare figure one side of which has a length of a number A of pixels (or dots) is played on the display panel 103 whose height and width respectively have a number A of pixels (or dots) and a number B of pixels (or dots), the number A being larger than the number B.

When the user selectively activates a movie capture function of the mobile terminal, the movie data captured by the camera portion 6 is displayed on the display portion 7 (step S200). At this point, the user selectively activates the camera-shake compensation function by a suitable manipulation (step S201). Once the camera-shake compensation function is activated, each image data captured by the sensor portion 200 of the camera portion 6 is clipped into an image data having a foursquare figure each side of which consists of a number A of pixels (or dots), by the signal processor 202 (step S202). The foursquare image data of A dots×A dots is then converted into the picture data 302 by the RGB converter 204 (step S203). The foursquare picture data 302 inputted into the first RGB I/F 100 of the display portion 7 from the second RGB I/F 205 of the camera portion 6 and via the picture bus 9, is written on the image RAM 101 consisting of the foursquare matrix of pixels (step S104). In the present case, the data size of the picture data 302 outputted from the camera portion 6 does not coincide with the size of the display panel 103, but coincide with the image RAM 101 consisting of the foursquare matrix of pixels. Accordingly, the topmost and leftmost pixel ("point a") of the image RAM 101 is determined to be the write start address at which the writing of the picture data 302 begins. (step S204).

In general, when the picture data is displayed on the display panel 103, the picture data is written on only a part of the image RAM 101 having the foursquare matrix, and only a part of the picture data which has been written on the part of the image RAM 101 is to be displayed. Therefore, the display controller 104 essentially obtains the size and write start address of the picture data. In this case, however, the picture data is written on the entire area of the image RAM 101, and therefore the display controller 104 need not obtain the size and write start address of the picture data.

When a picture data 302-A1 of a first frame of the moving picture 302 has been written on the image RAM 101 consisting of the foursquare matrix (step S205), the display controller 104 identifies in the written picture data 302-A1 a part corresponding to a major object of the image as captured by the sensor portion 200 (step S206). In this example, a person having a bamboo sword is identified as the most likely major object, and the display controller 104 determines a pixel at a "point b" in the image RAM 101 to be a read start address at which reading out of the picture data 302-A1 begins, so that the object as displayed on the display panel 103 will be located in a center of the display panel 103 with respect to its width having the number B of pixels (step S207). Once the read start address is determined, the driver portion 102 reads out the picture data 302-A1 by starting from the "point b" such that a picture data written on a topmost row of the image RAM 101, which row has a length of the number B of pixels (or dots), is read out, and then the picture data of the next topmost row in the image RAM 101 is read out from a point immediately below the "point b". By iterating this step, data of a total of the number A of rows each of which has the number B of pixels is read out from the image RAM 101. The picture data 302-A1 read out from the image RAM 101 is transferred to the display panel 103 (step S208) where a picture data 302-B1, which is a compensated version of the picture data 302-A1, is displayed such that the major object is appropriately located in the center of the display panel 103 (step S209). It is noted that the picture data written on the shaded portions of the image RAM 101 as shown in FIG. 7 is not displayed on the display panel 103.

Next, a picture data 302-A2 of a second frame of the moving picture 302 is written on the image RAM 101 consisting of the foursquare matrix of pixels (step S205). The display controller 104 identifies the person having the bamboo sword as the most likely major object in the picture data 302-A2 (step S206), similarly to the picture data 302-A1, and determines a "point c" as the read start address at which the reading out of the picture data 302-A2 from the image RAM 101 consisting of the foursquare matrix begins, so that the object will be located in the center of the display panel 103 with respect to its width having the number B of dots (step S207). Once the read start address is determined, the driver portion 102 reads out the picture data 302-A2 by starting from the "point c", such that a picture data written on the topmost row of the image RAM 101, which row has the number B of pixels (or dots), is read out, and then the picture data on the next topmost row in the image RAM 101 is read out from a point immediately below the "point c". By iterating this step, a total of the number A of rows each of which has the number B of pixels is read out from the image RAM 101. The picture data 302-A2 read out from the image RAM 101 is transferred to the display panel 103 (step S208) where a picture data 302-B2, which is a compensated version of the picture data 302-A2, is displayed such that the major object is appropriately located in the center of the panel 103 (step S209). In this time also, the picture data written on the shaded portions of the image RAM 101 as shown in FIG. 7 is not displayed on the display panel 103.

Similarly to the above-described steps regarding to the first and second frames, a picture data 302-A3 of a third frame of the moving picture 302, and sequentially a picture data 302-A4 of a fourth frame of the moving picture 302 is sequentially written on the image RAM 101 (step S205). The display controller 104 identifies the most likely major object in the picture data 302-A3, 302-A4 written on the image RAM 101 (step S206), and determines a "point a (with regard to the third frame)", "point d (with regard to the fourth frame)" as the read start address at which the reading out of the picture data 302-A3, 302-A4 from the image RAM 101 begins, so that the object will be located in the center of the display panel 103 with respect to its width having the number B of dots (step S207). Once the read start address is determined, the driver portion 102 reads out the picture data 302-A3, 302-A4, by starting from the "point a (for the third frame)", "point d (for the fourth frame)", such that a picture data written on the topmost row of the image RAM 101, which row has a length of the number B of pixels (or dots), is read out, and then the picture data on the next topmost row in the image RAM 101 is read out from a point immediately below the "point a (with regard to the third frame)", "point d (with regard to the fourth frame)". By reiterating this step, a total of the number A of rows each of which corresponds to the number B of pixels is read out from the image RAM 101. The picture data 302-A3, 302-A4 read out from the image RAM 101 is transferred to the display panel 103 (step S208) where a picture data 302-B3, 302-B4 which is a compensated version of the picture data 302-A3, 302-A4 is sequentially displayed such that the major object is appropriately located in the center thereof (step S209). In this time also, the picture data written on the shaded portions of the image RAM 101 as shown in FIG. 7 is not displayed on the display panel 103.

The above-described series of steps is implemented for each of the multiple picture data sent from the camera portion 6, thereby accomplishing the camera shake compensation with respect to the horizontal direction.

In the above-described embodiment, the widthwise compensation of camera shake is performed. However, the camera shake compensation can be performed heightwise, if the image RAM 101 is adapted to have a redundant space in the direction of its height. Further, not only the vertically oblong moving picture but also a horizontally oblong moving picture can be compensated for the adverse effects of camera shake, by executing a similar process as described above.

FIG. 9 shows one example of a data processing sequence following which the moving picture which has been subjected to the camera shake compensation as described above and shown in FIGS. 7 and 8, and is less blurry, is recorded and stored.

During execution of camera shake compensation according to the sequence of FIG. 8, the user manipulates suitable means to initiate recording of the moving picture (step S300). In the display portion 7, when the picture data which has been subjected to the camera shake compensation is transferred to the display panel 103 by the driver portion 102, the same picture data is also outputted to the first bus I/F 105 (step S301). The picture data outputted from the driver portion 102 to the display panel 103 is displayed on the panel 103 (step S209), while the picture data sent to the first bus I/F 105 is received by the control portion 3 via the data bus 8 (step S302). The control portion 3 converts the picture data transferred from the display portion 7 into the YUV format (step S303), then encodes the YUV data and stores the encoded YUV data in the memory portion 4 (step S304). The series of steps is executed for each of the all frames of the moving picture 302 taken by the camera portion 6.

Figure 10A:
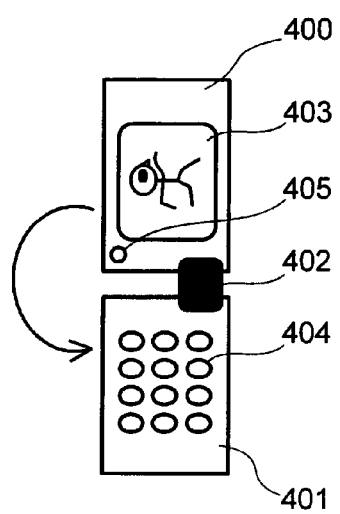
FIG. 10 shows a mobile terminal according to a fourth embodiment of the invention.
Figure 10B:
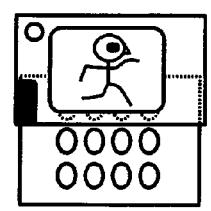
Figure 10C:
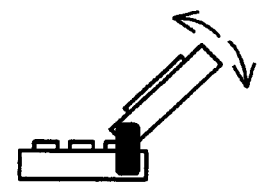

FIGS. 10A–10C illustrates a posture change or relative rotation of an upper unit 400 and a lower unit 401 of a mobile phone according to a fourth embodiment of the invention.

The mobile phone according to the present embodiment comprises the upper unit 400, the lower unit 401 and a connecting member 402 which connects the upper and lower units 400, 401 on one of a left side and a right side of a longitudinal centerline of the units 400, 401 as seen in their flip-opened state. The connecting member 402 has three axes and is adapted such that the upper and lower units 400, 401 are relatively pivotable about a first axis of the connecting member 402 to flip-open/close the mobile phone, and also relatively rotatable about a second axis and a third axis of the connecting member 402 each of which is perpendicular to the first axis and which are perpendicular to each other. In FIG. 10, a case where the connecting member 402 is disposed on the right side of the longitudinal centerline of the upper and lower units 400, 401 is shown for illustrating the embodiment. However, the same effects as those of this embodiment can be attained even where the connecting member 402 is disposed on the left side of the centerline. A display panel 403 and a camera 405 are built in the upper unit 400, while the input device 404 is mounted in the lower unit 401.

The user flip-opens the mobile phone. Then, the upper unit 400 is rotated 180 degrees around the second axis of the connecting member 402 in a direction away from the connecting member 402 with respect to the longitudinal centerline of the mobile phone while the lower unit 401 is held horizontally, so that the upper unit 400 is partially positioned above the lower unit 401. The mobile phone in this posture is put on a planar surface, e.g., on a desk, such that the longer sides of the display panel 403 extends widthwise, for thereby facilitating viewing for a relatively long time a moving picture which is rotated 90 degrees when displayed on the vertically oblong display panel 403. That is, in such a case, the user can view the moving picture without holding the mobile phone with his or her hand. It is noted here that the flip-type mobile phone is adapted such that the upper and lower units 400, 401 are temporarily fixable at a suitable angle therebetween, to facilitate making a phone call, namely, to eliminate awkward manipulation when making a phone call which the user may suffer from, if the upper and lower units 400, 401 are fully opened and continuously flat. The thus temporarily fixed upper and lower units 400, 401 do not butt each other when relatively rotated around the second axis as described above.

According to the present fourth embodiment, the connecting member 402 is not disposed on the longitudinal centerline but is quite deviated from the longitudinal centerline, thereby making it possible to orient the vertically oblong display panel 403 in the posture where the display panel 403 is wider than is tall as seen by the user, and tilt the display panel 403 by pivoting the display panel 403 around the third axis of the connecting member 402 (as shown in FIG. 10C). Thus, the user can adjust the angle of the display panel 403 as desired, and comfortably view a movie such as a TV picture for a long time. Further, according to this embodiment, the camera 405 is disposed on one side of the display panel 403, thereby making it possible to make a TV telephone call with the mobile phone laid on something suitable. Still further, when the mobile phone is laid down in the posture as described above, only a part of the keys are positioned beneath the upper unit 400, and thus the keys which are not beneath the upper unit 400 can be manipulated, thereby enabling an input of information by the user, to a certain extent.

Figure 11A:
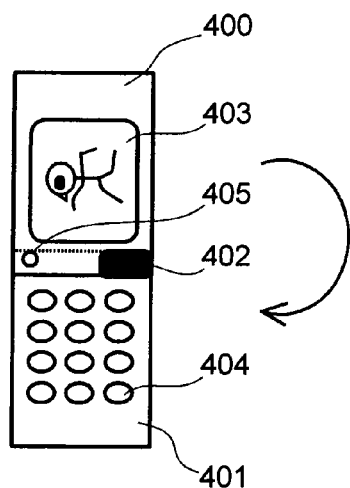
FIG. 11 shows a mobile terminal according to a fifth embodiment of the invention.
Figure 11B:
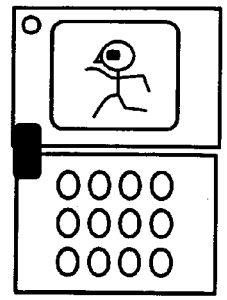
Figure 11C:
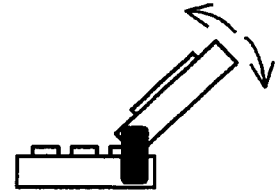

FIGS. 11A–11C illustrates a posture change or relative rotation of the upper and lower units 400, 401 of a mobile phone, according to a fifth embodiment of the invention.

The user flip-opens the mobile phone. Then, the upper unit 400 is rotated 180 degrees around the second axis of the connecting member 402 in a direction toward the side of the connecting member 402 with respect to the longitudinal centerline of the mobile phone, while the lower unit 401 is held horizontally, so that the upper and lower units 400, 401 are laterally aligned. The mobile phone in this posture is put on a planar surface, e.g., on a desk, such that the longer sides of the display panel 403 extends widthwise, for thereby facilitating viewing for a relatively long time a moving picture which is rotated 90 degrees when displayed on the vertically oblong display panel 403. That is, in such a case, the user can view the moving picture without holding the mobile phone with his or her hand.

According to the present fifth embodiment, the connecting member 402 is not disposed on the longitudinal centerline but is quite deviated from the longitudinal centerline, thereby making it possible to orient the vertically oblong display panel 403 in the posture where the display panel 403 is wider than is tall as seen by the user, and tilt the display panel 403 by pivoting the display panel 403 around the third axis of the connecting member 402 (as shown in FIG. 1C). Thus, the user can adjust the angle of the display panel 403 as desired, and comfortably view a movie such as a TV picture for a long time. Further, according to this embodiment, the camera 405 is disposed on one side of the display panel 403, thereby making it possible to make a TV telephone call with the mobile phone laid on something suitable. According to the embodiment, when the mobile phone is laid down in the posture as described above, a surface on which the input device 404 is provided and a surface on which the display panel 403 is provided are continuous, an input of information through manipulation of the keys by the user is readily possible.

As means for displaying the moving picture with 90-degrees rotation, an exclusive key for switching orientation of the moving picture is provided. The user arbitrarily selects whether the moving picture is to be rotated 90 degrees or not, and obtains a size of the picture to be played, in advance. When the picture to be played has a width larger than that of the display panel 403, the user may push the exclusive key to play the picture in the rotated orientation, on the display panel 403.

Alternatively, the mobile phone may have a function to automatically select whether the picture is rotated or not, depending upon the activated application.

In general, the mobile phone is not held in the posture where its upper and lower units 400, 401 are rotated as shown in FIG. 10 or 11 when the user makes a call. Accordingly, when the mobile phone receives an incoming call while the picture is displayed with its orientation rotated 90 degrees, the displaying the picture with 90-degrees rotation is temporarily suspended and the picture is automatically returned to its normal orientation, i.e., a vertical or portrait orientation. During the user picks up and is on the phone call, the displayed picture is kept in the portrait orientation. Upon termination of the call, the displaying of the moving picture is automatically resumed, from the scene at which the playing the moving picture was temporarily suspended, with the orientation of the picture 90 degrees rotated, as before the telephone call.

The resuming the application upon the termination of the call may not be performed, in accordance with a prior setup by the user. In this case, the displaying the picture with 90-degrees rotation is not resumed, but a usual standby screen in the portrait orientation is displayed.

In each of the embodiments as described above, the figure of the display panel 103, 403 is, or substantially is, an oblong rectangle. However, the figure may be others; it may be an ellipse or a rhombus, for example. In a case where the display panel 103, 403 is elliptical or rhombic, the image RAM 101 is adapted to consist of a matrix of pixels, a shorter side of which has a first number of pixels which first number is larger than a second number of pixels aligned on the longest part of the panel 103, 403. In this case, pixel numbers of a row and a column of the picture data to be stored in the image RAM 101 are compared with the second number, and if one of the numbers of the row and column of the picture data is larger than the second number, the one of the row and column is oriented parallel to the shorter side of the image RAM 101, when stored. This arrangement allows a greater flexibility in designing the figure of the display panel 103, 403, which may be a liquid crystal panel, for thereby improving the design of the mobile terminal, while maximizing the size of the display panel 103, 403.

In a case where the elliptical or rhombic display is employed, it is preferably used as a sub display, since the user usually desires to view a moving picture on a display having an oblong rectangular figure, or, a substantially oblong rectangular figure. For instance, in a flip phone having a display "A" which the user can not see when the phone is folded, and a display "B" smaller than "A" and mounted on the back of the phone, the elliptical or rhombic display is preferably employed as the display "B". In this instance, the present invention may also be applied to the display "A", to accordingly improve the overall design of the mobile phone.

Further, although the display panel 103, 403 in the illustrated embodiments is vertically oblong, it is to be understood that the invention can be similarly applied to a mobile phone having a display panel which is horizontally oblong, so as to enjoy the same advantages as achieved by the above-described embodiments.

According to the illustrated embodiments, the 90-degrees rotation of the picture is performed only by operations of the camera portion 6 and the display portion 7 and without any load on the control portion 3, when to display the horizontally oblong picture on the vertically oblong display panel 103, 403, while maximizing the picture size.

Further, according to the illustrated embodiments, the camera portion 6 and the display portion 7 are connected to each other via the picture bus 9 which is different from the data bus 8 of the control portion 3. Thus, when the movie data taken by the camera portion 6 is to be monitored on the display portion 7, it is made possible to display on the display portion 7 the picture data converted by the camera portion 6 and then transferred via the picture bus 9, without being transmitted through the control portion 3. Hence, the load on the control portion 3, as well as the power consumption are effectively reduced.

Still further, the above-described embodiments more effectively prevent an increase in the required memory capacity, as well as deterioration in performance of the control portion 3, as compared with an arrangement where the picture rotating process is executed by the control portion 3.

According to the above-described embodiments, when a moving picture encoded into MPEG or other formats is played, the control portion 3 decodes the picture data and outputs the decoded data to the camera portion 6, which converts the data into the RGB data and forwards the picture data to the display portion 7. Therefore, the control portion 3 can be exclusively devoted to its decoding process, and also the frequency of access to the memory portion 3 on the data bus 8 can be lowered, except the access necessary for the decoding process. Thus, this arrangement contributes to quickly responding to the existing tendency to enlarge or widen the display of mobile terminals.

In addition, according to the second embodiment as described above, the picture data is written on the image RAM 101 incorporated in the display portion 7 and having a foursquare figure whose size is larger than that of the display panel 103, and each time the written picture data, or frame, is updated to the next one, the object is newly detected in the image RAM 101, so that the object is kept displayed at the center of the display panel 103. This arrangement makes it possible to perform the camera shake compensation without placing a load on a CPU.

Further, the user can store the moving picture which has been compensated with respect to the camera shake effects, according to the third embodiment as described above.

In the arrangement where the image RAM 101 consists of the at least two segments which are controllable independently of one another to be powered on/off or held in the standby mode, it is possible to power off the segment on which the picture data is not written or to hold that segment in the standby mode, since the size of the picture data to be written into the image RAM 101 is known in advance. According to this arrangement, the power consumption during the data writing operation is advantageously reduced.

In a case where the picture data inputted into the memory portion 4 is rather small, the picture data may be enlarged when read out from the memory portion 4. The data processing sequence following the readout is similar to that as illustrated in FIGS. 5 and 6. According to this arrangement, the embodiments described above are made applicable to cases where the picture data inputted into the memory portion 4 is rather small.

What is claimed is:

1. A mobile terminal including a plurality of modes, comprising:
   a camera which outputs image data;
   a display which displays image data;
   a controller which encodes the image data outputted by the camera and decodes encoded image data;
   a memory which stores the image data encoded by the controller;
   a first bus interface which connects the camera, the memory and the controller; and
   a second bus interface which connects the camera and the display,
   wherein the plurality of modes include a monitor mode in which the display displays image data outputted by the camera without storing the image data by the memory, a record mode in which the controller encodes image data outputted by the camera and the memory stores the encoded image data, and a play mode in which the controller decodes encoded image data stored by the memory and the display displays the decoded image data,
   wherein, in the monitor mode, image data are transmitted and received via the second bus interface and not via first bus interface;
   wherein the camera comprises a sensor for capturing an optical image; an analog-to-digital converter for converting analog data of the optical image into digital image data; a signal processor for converting the digital image data into YUV format; a first output interface for supplying the YUV format data to the first bus interface; and a RGB converter for converting the image data from YUV format into RGB data; and a second output interface for supplying the RGB data to the second bus interface.

2. The mobile terminal according to claim 1, wherein image data are transmitted and received by the first bus in the record mode and the play mode.

3. The mobile terminal according to claim 2, wherein the record mode is the mode in which image data outputted by the camera is displayed by the display in addition to storing the encoded image data by the memory, and image data are transmitted and received by both the first bus and the second bus in the record mode.

* * * * *